July 15, 1952     G. W. SCHATZMAN     2,603,512
FENDER SHIELD ATTACHING MEANS
Filed Nov. 8, 1946     4 Sheets-Sheet 1
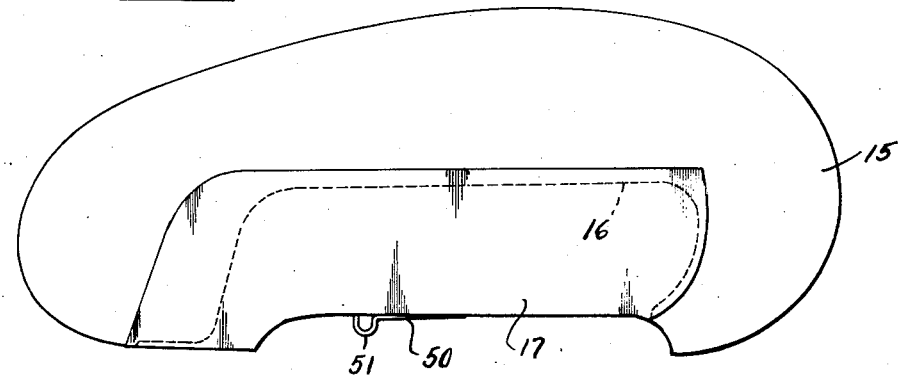
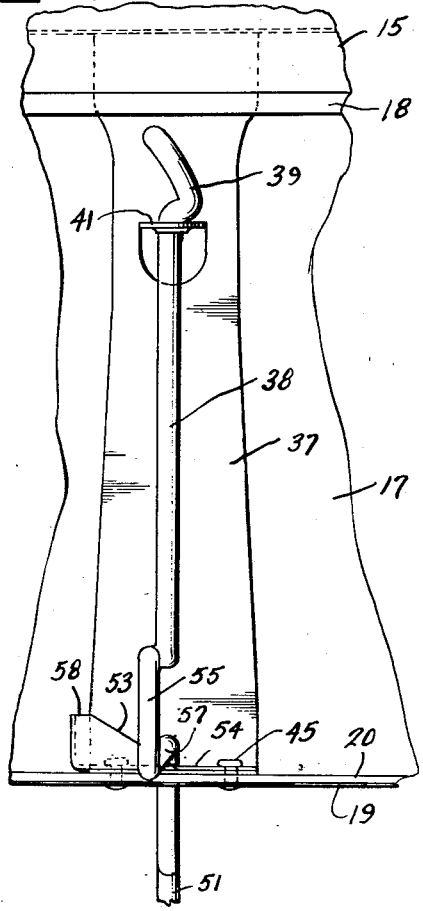
Inventor
GEORGE W. SCHATZMAN
By The Firm of Charles W. Hills, Attys July 15, 1952     G. W. SCHATZMAN     2,603,512
FENDER SHIELD ATTACHING MEANS
Filed Nov. 8, 1946     4 Sheets-Sheet 2
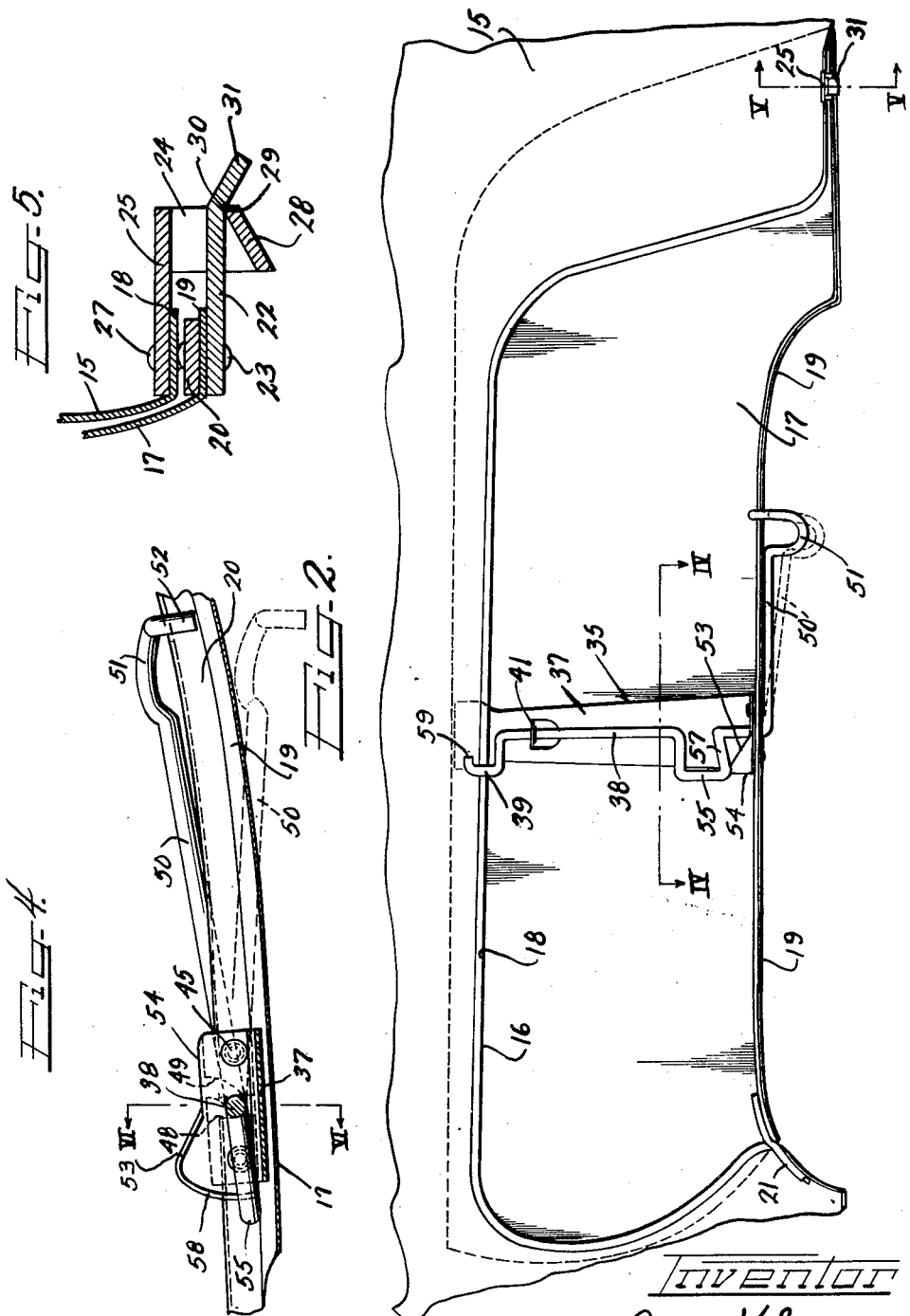
Inventor
George W. Schatzman
by The Firm of Charles W. Hills
Attys

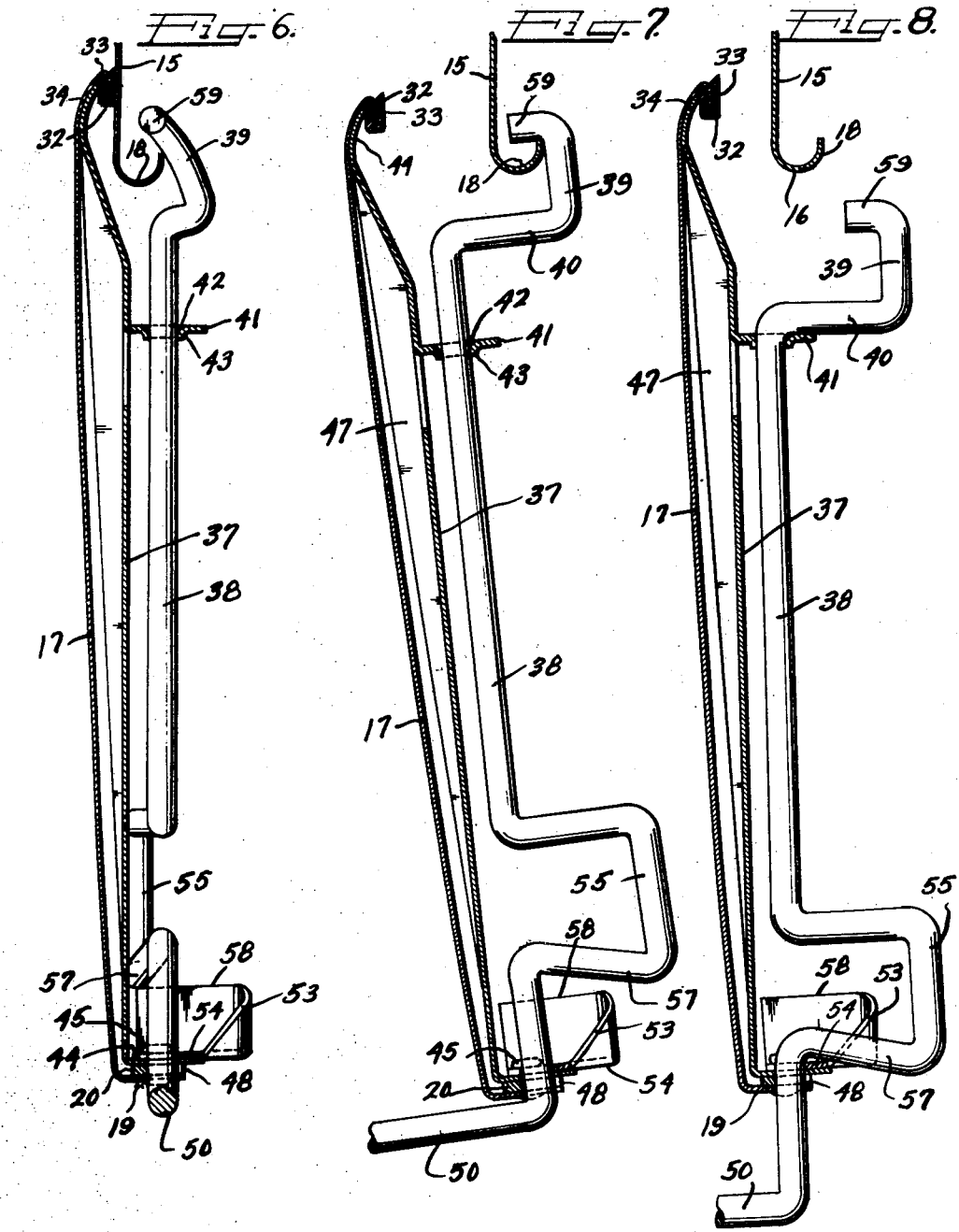

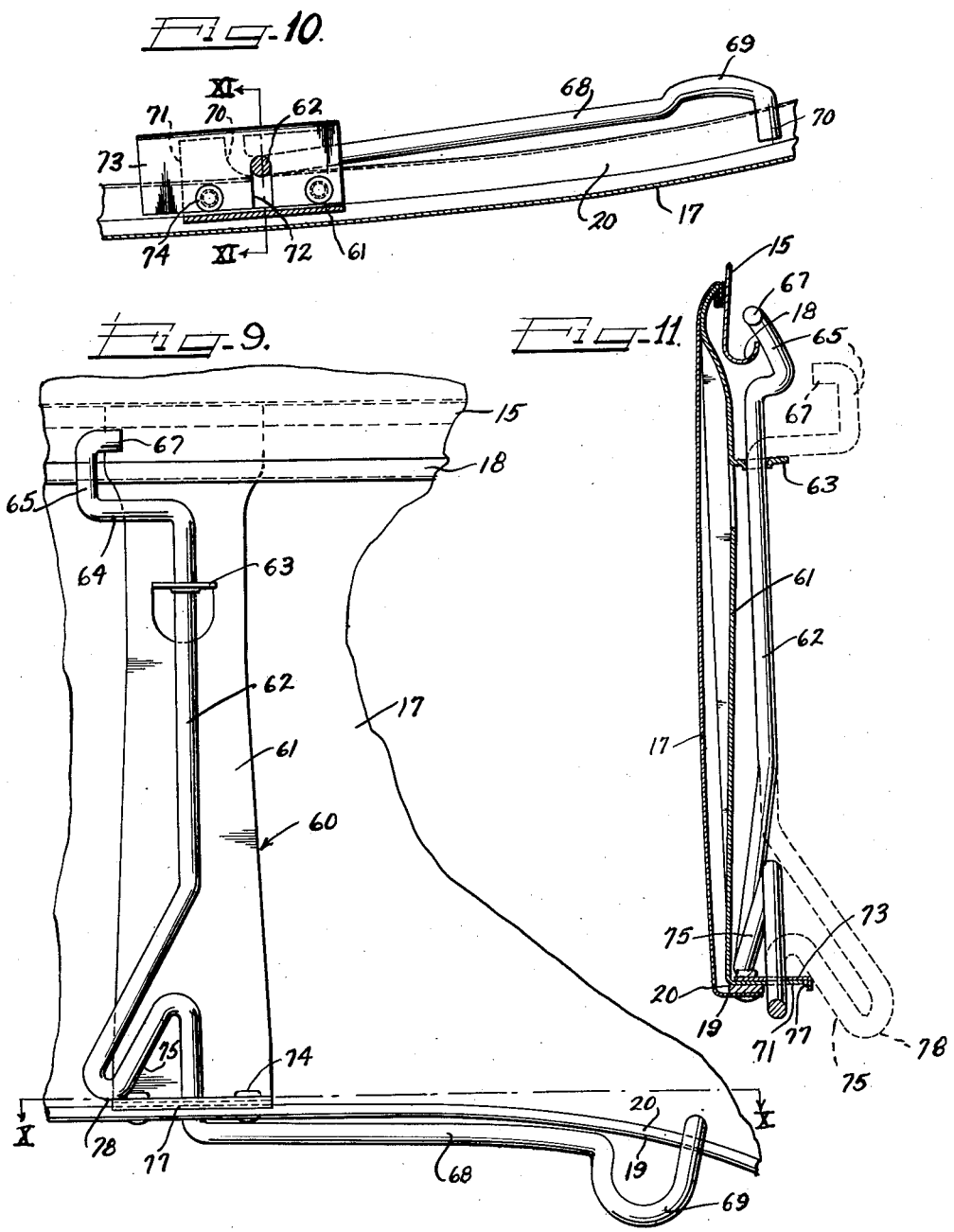

Patented July 15, 1952

2,603,512

UNITED STATES PATENT OFFICE 2,603,512

FENDER SHIELD ATTACHING MEANS

George W. Schatzman, Detroit, Mich., assignor to Houdaille-Hershey Corporation, Detroit, Mich., a corporation of Michigan Application November 8, 1946, Serial No. 708,513

11 Claims. (Cl. 292—114)

This invention relates to fender and fender skirt or shield constructions, and more particularly to novel fender and fender shield assemblies including new and improved means for securing the fender shield detachably in assembly with the fender.

In the vehicle industry, and particularly in the automobile industry, various means have been utilized to improve the appearance of vehicle fenders. The usual vehicle fender is provided with an opening which affords access to the vehicle wheel, and which permits the ready removal or replacement of the wheel in an axial direction. Since this opening inherently presents an unattractive outward appearance, detachable fender shields have been employed substantially to cover the opening pleasingly.

As the term "fender shield" shall hereinafter be employed it refers to any member which is adapted to be secured to a fender or other portion of a vehicle body for the purpose of covering the opening in the fender or vehicle body which is provided for access to or removal of a vehicle wheel. Furthermore, as the term "fender" shall hereinafter be employed, it refers to any form of wheel fender in its broad sense, whether such fender be separated from the vehicle body part, partly separated from the vehicle body part, or actually an integral part of the vehicle body, and whether or not it projects outwardly away from the principal body portion of the vehicle.

An important object of the present invention is to provide a novel fender and fender shield assembly in which the fender shield is secured detachably to the fender in a novel manner.

Another object of the invention is to provide a novel fender shield construction which is economical to manufacture, which is rugged and reliable in use, and in which the fender shield may be readily and quickly attached to or detached from the vehicle fender.

Another object of this invention is to provide a fender shield having novel clamping and latching means thereon.

Still another object of the invention is to provide a novel mechanism for detachably securing a fender shield to a vehicle fender.

Yet another object of the invention is to provide novel means for securing a fender shield detachably to a fender and which is adapted for simple and easy attachment or detachment of the fender shield but is nevertheless positive and reliable in action.

It is also an object of the invention to provide improved means in a fender shield which is extremely simple as to its components and in operation for detachably securing a fender shield to a fender.

A still further object of the invention resides in the provision of novel fender shield clamping and latching mechanism which is at least in part semi-automatic in operation.

A further object of the invention is to provide latching and clamping mechanism for a fender shield wherein both reciprocal and rotary movement of a latching and clamping member results from a simple unidirectional manipulation of said member for actuating the same into or out of latching and clamping positions.

An additional object of the invention is to provide latching and clamping mechanism for fender shields susceptible of extremely low cost production.

Other objects, features and advantages of the present invention will become readily apparent from the following detailed description of a preferred embodiment thereof taken in conjunction with the accompanying four sheets of drawings in which:

Figure 1 is an outside elevational view of a right hand fender and fender shield assembly embodying the features of the present invention;

Figure 2 is an enlarged fragmentary inside elevational view of the fender shield and immediately adjacent portions of the fender;

Figure 3 is a further enlarged central inside fragmentary elevational view of the fender and fender shield assembly showing the latching and clamping mechanism of Figure 2 with the latching and clamping member thereof in the open or non-latching position;

Figure 4 is a horizontal sectional view through the latching and clamping mechanism as though taken on the line IV—IV of Figure 2, but showing the mechanism as it appears in a left hand fender;

Figure 5 is an enlarged sectional detail view taken substantially along the line V—V of Figure 2;

Figure 6 is a vertical sectional view taken substantially along the line VI—VI of Figure 4;

Figure 7 is a vertical sectional view similar to Figure 6 but showing the latching and clamping mechanism swung open for interim holding of the fender shield partially open preliminary to full release;

Figure 8 is a vertical sectional view similar to

Figures 6 and 7 but showing the latching and clamping mechanism as it appears when fully released;

Figure 9 is a fragmentary inside elevational view of a fender and fender shield assembly showing a modified form of the latching and clamping mechanism as applied to a right hand fender;

Figure 10 is a horizontal sectional view similarly as though taken on line X—X of Figure 9 but showing the mechanism as applied to a left hand fender; and Figure 11 is a vertical sectional view taken substantially along the line XI—XI of Figure 10.

Exemplifying the invention, Figures 1 and 2 show a right hand fender 15 having a wheel opening 16 which is closed by a fender shield 17. The wheel opening 16 is defined by an inturned reinforcing flange 18 which is preferably of substantially hook shape cross section with an inner edge spaced from the adjacent inner surface of the fender. Beyond the ends of the wheel opening 16, the fender flange 18 is preferably formed substantially flat rather than curved.

Along its lower edge, the fender shield 17 is preferably formed with an inwardly extending reinforcing flange 19 which is stiffened by a reinforcing bar 20 and at its opposite ends carries bracket structures by which the fender shield is preliminarily mounted upon the fender. To this end, the front end of the fender shield flange 19 supports a hanger finger 21 which extends therebeyond and is adapted to engage behind the fender and upon the fender reinforcing flange 18 adjacent to the wheel opening.

At its rear end, the fender shield flange 19 carries an inwardly extending bracket finger 22 secured thereto as by means of a rivet 23 (Figure 5. The finger 22 is adapted to be projected into shield-supporting relation within a hanger eye structure 24 carried by a hanger plate 25 secured as by means of rivets 27 to the fender flange 18 beyond the rear end of the wheel opening 16. The hanger eye 24 includes a horizontal hanger bar 28 tilted in an upwardly oblique angle and having an inner edge upper corner 29 adapted to engage within a transverse groove 30 formed in the finger 22 at the juncture with the main portion thereof of a slightly downwardly diagonal hook extension or terminal 31. The relationship of the hanger finger 22 to the hanger eye 24 is such that in the initial assembly of the fender shield with the fender the finger 22 is adapted to be projected into assembled relation within the eye 24 while the fender shield is tilted outwardly away from the fender. At the same time the hanger finger 21 is adapted to be assembled with the contiguous portion of the fender flange 18.

After the preliminary assembly effected by means of the lower edge front and rear end brackets, the fender shield 17 is adapted to be swung into closing relation to the wheel opening 16, the margins of the fender shield overlapping the wheel-opening margin of the fender 15. A snug, rattle proof engagement of the fender shield with the margin of the fender is attained by means of a resilient cushioning gasket 32 (Figure 6) carried by a down-turned flange 33 along the shield-contacting margin of the fender shield and offset from the inner surface of the fender shield by a curvate marginal formation, as indicated at 34. In the present instance the fender shield 17 is preferably formed as a sheet metal panel appropriately exteriorly dimensioned and finished to match the general shape and finish of the associated fender.

According to the invention, novel latching and clamping mechanism 35 is provided for securing the fender shield 17 in the full closing position relative to the wheel opening 16 in the fender. Such mechanism preferably comprises a supporting bar or plate 37 mounted vertically at approximately the longitudinal center of the fender shield and providing a supporting and guide structure for a latching and clamping member 38 which may be in the form of a reciprocable and rotary lock rod. The plate may also serve as a reinforcing structure for the fender shield 17.

The construction, arrangement and operation of the lock rod 38 are such that in one position thereof, as shown in Figure 6, it clampingly and latchingly engages the fender flange 18 to clamp the fender shield 17 tightly against the fender, and in another position of the lock rod holds the fender shield 17 in an interim partially open position as shown in Figure 7, while in a third position of the lock rod it is disposed to clear the fender shield flange 18 and allows the fender shield to be swung away from the fender sufficiently for release of the lower edge of the fender shield from the end supporting bracket structures.

Accordingly, the lock rod 38 is preferably formed of round cross-section having an upper end portion formed as a curvate clamping cam head 39 joined integrally to the main body of the rod by a right angular offsetting arm 40 whereby the head 39 is adapted to be swung into and out of camming, latching engagement with the fender flange 18.

For guiding the locking rod 38 reciprocably and rotatably, the supporting plate 37 is provided with an integral struck out, horizontally extending bearing ear 41 having an eye opening 42 therein defined by a downwardly protruding, pressed out bearing flange 43. Above the ear 41, the supporting plate 37 is preferably formed with a curvate head flange 44 which is complementary to and received within the curvate upper marginal portion 34 of the fender shield panel and extends behind the upper marginal reinforcing flange 33 of the fender shield. At its lower end the supporting plate 37 has a horizontal foot flange 44 which is secured as by means of rivets 45 to the top of the lower fender flange reinforcing bar 20. Along its longitudinal edges, the plate 37 may be reinforced against bowing by right angular stiffening flanges 47.

In conjunction with the bearing ear 41 which guides and supports the upper portion of the lock rod 38, a rotary and reciprocal coaxial guide is provided for the lower portion of the latching rod in bearing structure afforded by an inwardly opening slot 48 in the flange 19 and the reinforcing bar 20 and a curved locking slot 49 in the foot flange 44 intersectingly related to the slot 48 (Figure 4). Thereby, the locking rod 38 is reciprocably guided for longitudinal movement into and out of clamping relation to the fender flange 18, the offsetting arm 40 of the rod acting as a stop engaging the bearing ear 41 in the fully retracted fender flange clearing, non-latching position of the rod, and a right angular lower terminal portion 50 providing a stop limiting upward reciprocal movement of the rod into the latching and clamping position.

By preference, the lower terminal portion 50 is of substantial length and affords a crank handle which is adapted to be manipulated below the lower edge of the fender shield. Adjacent its free extremity, the handle extension 50 is preferably formed with a downward loop 51 adapted for convenient manipulation of the handle and providing a finger hold for flexing the handle portion down as shown in Figure 2 to clear a latching, terminal finger 52 thereon from above and behind the fender shield flange 19 over which it is adapted to engage as shown in Figure 4 for locking the rod against unintentional rotation from the clamping and latching position thereof.

The guide bearings for the lock rod 38 are sufficiently free to permit relatively free and easy reciprocation of the lock rod so that when the lock rod is released from clamping and latching relation to the fender flange 19, it tends to drop by gravity to the released, non-latching position, the lock rod 38 may thus be said to be under the influence of a normal gravity bias to non-latching position.

Simple and efficient means are provided for effecting automatic, upward movement of the lock rod 38 into latching and clamping relation as an incident to rotation of the rod. Herein such means comprises an elevating cam 53 provided as a turned up edge on a bracket such as a plate 54 which is secured upon the top of the foot flange 44 as by means of the rivets 45. The cam 53 is disposed in the path of a shoulder loop 55 formed in the lock rod 38 substantially in a plane with the offsetting arm 40 and having a lower cam follower shoulder 57. The lower end of the cam edge 53 is so disposed that the follower shoulder 57 clears the same in the fully retracted position of the lock rod 38, as shown in Figure 8, and in which position the handle extension 50 extends forwardly of the fender shield. When the handle 50 is turned to rotate the rod 38 and swing the cam head 39 into latching and clamping position, the follower shoulder 57 rides up the cam edge 53 until it reaches maximum elevation and rides onto a horizontal elevation retaining edge to hold the lock rod in a fully raised position in opposition to its gravitational bias and resisting to some extent tendency of the cam head 39 to cam the lock rod rotatably out of latching position. The latching terminal 52 on the rod handle, of course, more positively resists unlatching movement of the locking rod.

From Figures 4, 6 and 8, it will be noted that the follower shoulder 57 is preferably disposed at a downwardly oblique angle and that the cam edge 53 and the retainer edge 58 are disposed in such a pattern with respect to the sweep of the follower shoulder 57 and the camming and latching rotation of the lock rod that elevational movement of the lock rod is substantially accelerated by reason of the upward thrust not only of the cam edge 53 but also of the oblique shoulder 57 as it progressively engages the cam edge from adjacent the inside corner toward the lower outside corner thereof. Furthermore, the proper elevation of the lock rod 38 is attained for clamping engagement with the flange 18 substantially without the frictional resistance which might otherwise be encountered by the necessity for the cam head to draw or cam itself up onto the flange 18.

Upon releasing the cam head 39 from the latching and clamping relation to the flange 18, by reverse rotation of the lock rod 38, the horizontal retainer edge 58 holds the lock rod against dropping until an integral right angular horizontally extending upper hook terminal 59 swings into position to engage with the edge of the flange 18 as the fender shield 17 swings outwardly due to the outward overbalance resulting from the inward disposition of the lower edge end bracket structure by which it is primarily supported upon the fender. This prevents the fender shield from dropping away from the fender out of control but holds it in a partially open position as shown in Figure 7.

Full release of the lock rod 38 can then be effected simply by pushing the upper portion of the fender shield 17 in towards the fender 15 until the retaining hook terminal 59 clears the fender flange 18. Thereupon the lock rod automatically drops down due to its gravitational bias until the offsetting arm 40 rests upon the bearing ear 41, in which position the head 39 is fully cleared below the fender flange 18 and the fender shield can be swung freely outwardly for demounting.

In the modified form of the invention shown in Figures 9 through 11, the structure and operation of the latching and clamping mechanism identified generally at 60 is substantially the same as that described in connection with the clamping and latching mechanism 35 but a somewhat different and in some respects simpler though possibly not as smooth working reciprocating cam structure is provided. The mechanism 60 comprises an elongated, vertically disposed supporting bar or plate 61 and a lock rod 62. The rod 62 is reciprocably and rotatably supported and guided adjacent its upper end by a bearing ear 63 integrally struck out sufficiently below the upper end of the supporting bar 61 to afford a full reciprocable range of movement for the rod. The ear 63 serves as a downward limit stop for an integral offsetting arm 64 carrying an integral clamping and latching head 65 formed at its terminus with a retaining hook portion 67.

At its lower end, the locking rod 62 is formed with a right angular manipulating handle portion 68 having a finger loop terminal 69 formed with a latching terminal 70 engageable above the fender shield flange 19 as and for the same purpose as described hereinbefore in connection with the latching and clamping mechanism 35.

A lower bearing for the locking rod 62 is provided by an arcuate inwardly opening slot 70 formed in the inner edge of a foot flange 71 on the supporting bar 61 and registering at its blind end with the inner blind end of an oppositely opening slot 72 formed in a cooperating stationary cam plate 73 which is secured upon the foot flange as by means of rivets 74 by which the foot flange is secured to the fender shield flange 19.

Camming of the lock rod 62 upwardly into clamping and latching relation is effected by an oblique cam loop 75 bent integrally from the body of the rod 62 and engageable with a downturned inner edge flange 77 on the plate 73. A shoulder 78 on the lower end of the cam loop 75 rests upon the cam plate 73 in the fully elevated condition of the lock rod and is slidable thereon in rotating the rod in completion of its arc of movement to full clamping position after the cam shoulder has climbed to maximum elevation. Thus, elevation of the lock rod 62 from the fully released non-clamping position thereof, as shown in broken outline in Figure 11, to the full clamping and latching position shown in Figure 9 is adapted to be effected simply by swinging the handle 68 to rotate the lock rod 62 90° to the full line clamping and latching position shown in Figure 11. In the course of such rotation of the rod 62 the cam loop 75 rides up the cam flange 77 until the shoulder 78 rests upon the upper surface of the cam plate 73 and then swings slidably into the latching and clamping position wherein the rod is held positively against descending until the operating handle extension 68 is intentionally released from the latching position as shown in Figures 9 and 10 and the handle swung out for unlatching. In this form of the invention, similarly as in the latching mechanism 35, the upper terminal hook 67 is adapted to engage the fender flange 18 as an incident to releasing movement of the lock rod 62 and partial swinging out of the upper edge of the fender shield 17. Also similarly as in the mechanism 35, the lock rod 62 is gravitationally biased normally to the non-latching position when the cam loop 75 is released from the cam plate 73.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a latching and clamping mechanism of the character described for a fender shield, a supporting structure, a lock rod having rotary and reciprocal components of operative movement, a handle for rotating the rod, a latching and clamping head on said rod adapted for engaging a fender to clamp the fender shield thereto, said head being constructed and arranged to be swung into and out of latching and clamping position upon rotation of the rod, a loop structure on said rod adapted to be swung with the latching and clamping head, and means coacting with said loop in the swinging thereof for imparting reciprocal motion in one direction to the rod, said means comprising a plate disposed adjacent to the rod and in a plane transverse to the axis of the rod and said loop being obliquely disposed and affording a cam shoulder cooperable with an edge of the plate in moving the rod as aforesaid and being retained against return by said plate until the rod is reversed rotatably to back the loop off of the plate.

2. In a fender shield structure, a latching and clamping mechanism including a latching rod having a latching and clamping head thereon adapted to engage the reinforcing flange above a wheel opening in a fender for clamping the fender shield to the fender, said head including a retaining hook terminal engageable with said flange automatically upon turning the rod out of latching and clamping position, cam means for moving the rod into the latching and clamping position, said cam means being cleared upon return of the rod from the latching and clamping position for releasing the rod to gravitational bias for operation of said retaining terminal hook to hold the fender shield against full release, said terminal hook being releasable, by manipulation of the fender shield, for clearing the fender flange to permit full removal of the fender shield.

3. In combination in a fender shield latching device, an elongated plate member adapted to be secured to the back of a fender shield and having a foot flange directed rearwardly, a vertically reciprocable and rotatable latching rod having an offset latching head at the upper end thereof adapted to be moved into latching relation to the rear of a fender with which the associated fender shield may be related by vertical movement of the latching rod coincident with rotary movement thereof to swing the latching head into the latching position, the lower end of the latching rod having means thereon for engagement to manipulate the latching rod for said movement, said supporting plate having bearing structure to support said latching rod for said vertical and rotary movement and with the lower end portion of the latching rod and said engagement means depending below said foot flange, a member having a cam surface and engaging said foot flange, and a follower loop bent laterally from the body of said rod engaging with said cam surface, said cam surface and said follower loop coacting in the rotation of the latching rod to move the rod vertically, whereby the rod approaches the latching position from a non-latching position wherein the latching head clears the margin of the fender.

4. In combination in a fender shield latching mechanism, a strut member adapted to be attached to the back of a fender shield in a vertical position, a latching rod having an offset latching head at the upper end thereof and means at the lower end thereof for engagement to manipulate the rod rotatably, means on said strut for slidably guiding the rod for rotary and vertical movements, a cam follower projecting laterally from the rod at an intermediate point thereof, and a cam plate bracket carried by said strut and having a turned up cam edge engaged by the cam follower to effect vertical movement of the rod as an incident to said rotary movement effected by manipulation of said lower end engagement means.

5. In combination in a fender shield latching mechanism, a strut member adapted to be attached to the back of a fender shield in a vertical position and having a foot flange, a latching rod having an offset latching head at the upper end thereof and means at the lower end thereof for engagement to manipulate the rod rotatably, means on said strut for slidably guiding the rod for rotary and vertical movements, a cam follower projecting laterally from the rod at an intermediate point thereof, and a plate member secured to the upper surface of said foot flange and providing a cam surface engaged by said cam follower and cooperable with the cam follower in effecting vertical movements of the rod coincident with rotary movements of the rod.

6. In a latching and clamping mechanism for a fender shield, a supporting member, a lock rod rotatably and reciprocably supported by said member, said lock rod having a clamping head at one end and means at the other end for manipulative engagement to operate the rod, said member having rod-guiding and bearing means adjacent to the opposite ends of said rod and carrying a cam element intermediate said guiding and bearing means, and said rod having a follower loop projecting laterally from the portion thereof intermediate said bearing and guiding means and having a shoulder portion for engagement with the cam element to drive the rod in one reciprocable direction upon rotation thereof in a given direction, said loop shoulder portion extending obliquely relative to the axis of the rod toward said cam element for progressive acceleration of the directional reciprocal movement of the rod during rotation of the rod and incidental interengagement of the shoulder and cam element.

7. In combination in a structure for maintaining a fender and fender shield together in assembly and wherein the fender has a wheel access opening therein bounded by an inturned marginal flange, latching and clamping mechanism arranged to be carried by the fender shield and engageable with said flange for clamping the fender shield in closing relation to said opening, said mechanism including means for automatically engaging said flange to hold the fender shield in an interim partly open position incident to dismounting of the fender shield, said means being adapted to be released by movement of the fender shield from the partly open position toward the closed position, and means including a stationary cam structure and a follower on said mechanism cooperative to drive said latching and clamping mechanism towards the latching and clamping position upon movement of the follower along the cam structure in one direction and said cam structure and said follower being separable to release the latching and clamping mechanism for operation of said holding means upon movement of the latching and clamping mechanism as a preliminary to release thereof.

8. In combination in a latching and clamping mechanism of the character described for a fender shield, a supporting structure, a lock rod having rotary and reciprocal components of operative movement, means engageable for rotating the rod, a latching and clamping head on said rod adapted for engaging a fender to clamp the fender shield thereto, said head being constructed and arranged to be swung into and out of latching and clamping position upon rotation of the rod, a structure projecting laterally from the rod spaced from said latching and clamping head and adapted to be swung in the rotation of the rod to swing the latching and clamping head, said laterally projecting structure having a surface extending obliquely relative to the axis of the rod and in the opposite direction from said latching and clamping head, and means disposed adjacent to the rod and operatively related to said laterally projecting structure and having a surface engageable by said oblique surface cooperable with said oblique surface to impart reciprocal motion to the rod in the rotation thereof to move said latching and clamping head into the clamping position, the oblique relationship of said oblique surface to the axis of the rod effecting acceleration of reciprocal thrust movement imparted to the rod progressively in the rotation of the rod to swing said laterally projecting structure and said latching and clamping head.

9. In combination in latching and clamping mechanism for a fender shield, a strut member having a foot flange, said foot flange having a slot opening from the edge thereof, a latching and clamping rod rotatably supported in said slot, said rod having a laterally projecting portion thereon, a plate having a slot opening from an edge thereof and registering with said foot flange slot to provide therewith a bearing for the portion of the rod encompassed by the edges defining the foot flange and plate slots, means securing said plate to said foot flange, and a surface on said plate cooperating with said laterally projecting portion of the rod for effecting reciprocal motion in one direction of the rod as the rod is rotated in the bearing provided by the foot flange and said plate.

10. In combination in a fender shield latching mechanism, a strut adapted to be secured to the inner side between the upper and lower margins of a fender shield panel, a rotary and reciprocable torsion latch rod, means on said strut providing a bearing for said latch rod, a cam element carried by said strut, and a follower extending laterally from the generally vertical axis of the body of the latch rod and cooperable to follow said cam element, said cam element and said follower being disposed to effect upward movement of the latch rod as an incident to turning of the latch rod into latching position to carry the upper end portion of the latch rod from a depressed position below the upper margin of the panel to an elevated position opposite said upper margin.

11. In combination in a fender shield latching mechanism, a strut arranged to be mounted in vertical position at the back of a fender shield, a reciprocal and rotary torsion rod latching member having a latching head at its upper end and means at its lower end for rotation thereof to turn the head into and out of latching position, means on the strut adjacent to the upper end thereof and in spaced relation below said upper end providing a bearing for the torsion rod member, means below said bearing means comprising a cam element carried by the strut member adjacent to the rod member on the side thereof toward which the latching head extends in latching position, and a follower bend in the body of the rod member including a follower shoulder engageable with the cam element to drive the rod member upwardly as an incident to turning of the rod member into latching position.

GEORGE W. SCHATZMAN.

REFERENCES CITED

The following references are of record in the file of this patent:

UNITED STATES PATENTS

| Number | Name | Date |
| --- | --- | --- |
| 860,769 | Tait | July 23, 1907 |
| 931,735 | Dickey | Aug. 24, 1909 |
| 1,052,785 | Allison | Feb. 11, 1913 |
| 1,169,104 | Turney | Jan. 18, 1916 |
| 2,113,753 | Wilson | Apr. 12, 1938 |
| 2,334,867 | Fergueson | Nov. 23, 1943 |
| 2,349,466 | Schueren | May 23, 1944 |